United States Patent
Vohmann et al.

(10) Patent No.: US 6,708,097 B1
(45) Date of Patent: Mar. 16, 2004

(54) METHOD AND DEVICE FOR CONTROLLING AND ADJUSTING A CLUTCH IN AN AUTOMOTIVE AUTOMATIC STEPPED POWER SHIFT GEARBOX

(75) Inventors: Martin Vohmann, Esslingen (DE); Ralf Dreibholz, Meckenbeuren (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/089,375

(22) PCT Filed: Oct. 24, 2000

(86) PCT No.: PCT/EP00/10455

§ 371 (c)(1),
(2), (4) Date: Mar. 28, 2002

(87) PCT Pub. No.: WO01/33110

PCT Pub. Date: May 10, 2001

(30) Foreign Application Priority Data

Oct. 30, 1999 (DE) .......................... 199 52 350

(51) Int. Cl.⁷ .............................................. G06I 17/00
(52) U.S. Cl. ......................................... 701/68; 180/170
(58) Field of Search ..................... 701/68, 67, 78; 180/170, 174, 175, 176, 177, 179

(56) References Cited

U.S. PATENT DOCUMENTS

| | | | |
|---|---|---|---|
| 4,817,462 A | 4/1989 | Dach et al. | 74/740 |
| 4,905,545 A * | 3/1990 | Leising et al. | 477/133 |
| 4,936,167 A * | 6/1990 | Mehta | 477/155 |
| 4,944,200 A * | 7/1990 | Benford et al. | 477/155 |
| 4,975,845 A * | 12/1990 | Mehta | 701/59 |
| 4,982,620 A * | 1/1991 | Holbrook et al. | 74/731.1 |
| 4,998,450 A * | 3/1991 | Nogle | 477/99 |
| 5,337,874 A * | 8/1994 | Oltean et al. | 192/111 A |
| 5,491,635 A | 2/1996 | Foeldi et al. | 364/431.1 |
| 6,413,189 B1 * | 7/2002 | Spiess et al. | 477/110 |

FOREIGN PATENT DOCUMENTS

| | | | |
|---|---|---|---|
| DE | 39 37 976 A1 | 5/1990 | B60K/23/02 |
| DE | 39 35 438 A1 | 5/1991 | B60K/41/02 |
| DE | 44 09 122 A1 | 2/1995 | B60K/41/02 |
| DE | 198 40 572 A1 | 3/2000 | F16D/48/06 |
| DE | 198 40 573 A1 | 3/2000 | F16D/48/06 |
| EP | 0 214 989 B2 | 6/1992 | F16H/3/66 |
| EP | 0 707 998 A2 | 4/1996 | B60K/41/02 |
| WO | 85/05666 | 12/1985 | F16H/3/66 |
| WO | 00/14434 | 3/2000 | F16H/61/02 |

* cited by examiner

Primary Examiner—William A. Cuchlinski, Jr.
Assistant Examiner—Olga Hernandez
(74) Attorney, Agent, or Firm—Davis & Bujold, PLLC (57) ABSTRACT

A process for controlling and regulating a clutch in a stepped load switchable automatic transmission for a motor vehicle where an electronic control device determines the behavior of the clutch during three operating conditions by way of a first or a second control circuit, and that a shift from a first into a second gear ratio stage takes place. In accordance with the invention, the first control circuit is used for controlling and regulating the clutch during the first operating condition, whose controlled variable is equivalent to the actual value of the engine speed ($n\_MOT\_IST$). During the second driving condition, a second control circuit is used, whose controlled variable is equivalent to the actual value of a differential rotational speed ($dnK\_IST$) of the clutch, and during the third operating condition, the clutch is impinged with a controlled pressure value dependent upon various influence magnitudes.

18 Claims, 4 Drawing Sheets

METHOD AND DEVICE FOR CONTROLLING AND ADJUSTING A CLUTCH IN AN AUTOMOTIVE AUTOMATIC STEPPED POWER SHIFT GEARBOX

The invention concerns a process for controlling and regulating a clutch in a stepped load-switchable automatic transmission for a motor vehicle, where an electronic control apparatus with two control circuits determines the behavior of the clutch. The invention further relates to an apparatus for carrying out the process for controlling and regulating a clutch in a motor vehicle drive.

A clutch is to be understood is to be understood in the sense of the invention as a startup clutch. Under these fall clutches arranged between an internal combustion engine and an automatic transmission, transformer bypass clutches, as well as clutches and brakes arranged in the automatic transmission, which can be used for starting up as well as shifting clutches.

The invention especially concerns wet-running startup clutches, which can be integrated into automatic transmissions. Nevertheless, usually these startup transmissions are arranged as a assembly groups on the transmission input, for example, also as a startup element in an automated stepped transmission. Especially in continuously variable transmissions, the wet startup clutch is also arranged as an assembly group on the transmission output.

Clutches and brakes are usually electro-hydraulically activated in the automatic transmission or in the automated stepped transmission independently of the use of the switch elements such as gear change clutches, startup clutches, or transformer bypass clutches. For this purpose, usually vehicle-specific, transmission-specific and operating condition-specific magnitudes, such as, for example, axle and gear ratios, engine torque, engine speed, gas pedal setting or the like, are processed in an electronic transmission control device and appropriate clutch-relevant output signals, for example, for pressure control or pressure regulation or during a gear shift or for rotational speed regulation during a drifting operation, transmitted to a hydraulic control apparatus, and there converted by means of actuators and hydraulic valves into hydraulic control pressures for the corresponding clutch.

A process for controlling a startup clutch is, among other things, known from DE 44 09 122 A1. The startup control unit herein consists of two phases; in a first phase, the input rotation speed is set to a theoretical value, wherein the theoretical rotational speed is established on the basis of performance specification by the driver and an operating activity. In the first phase, the difference between the input and output rotational speed of the clutch is reduced to zero following a theoretical value curve.

A process for regulating a clutch is known from DE 39 37 976 A1, which serves for vibration isolation. The slip in the clutch is hereby altered in dependence upon a rotational uniformity ascertained at the transmission output.

From EP 0 214 989 B2 it is also known to use a clutch integrated into the automatic transmission as startup element.

The previously unpublished DE 198 40 573 by the applicant describes a process for controlling and regulating a clutch in a continuously variable transmission for a motor vehicle according to which the clutch is controlled and regulated during two operating conditions by means of a first control circuit. The controlled variable here corresponds to the actual value of a differential rotational speed of the clutch. The first condition corresponds to a startup procedure and the second condition corresponds to driving with a variable gear ratio.

A process for controlling and regulating a clutch with an automatic stepped transmission with tractive force interruption or in an automatic load-switchable stepped transmission is known from the likewise unpublished DE 198 40 572. At the same time, the control or regulation takes place during three driving conditions by means of a first control circuit. The controlled variable corresponds to the actual value of a differential rotational speed of the clutch. The first condition corresponds to a startup process, the second condition corresponds to driving with constant gear ratio and the third condition exists when a load switching or a shift in gear ratio from a first into a second gear ratio step of the automatic transmission is initiated.

Underlying the present invention is the objective, proceeding from the previously described state of the art, of indicating a process for controlling and regulating a clutch in a stepped load-switchable automatic gear shift for a motor vehicle as well as a device for carrying out the process for controlling and regulating and to refine this with respect to the multiple use of a single clutch, especially with respect to improved regulation quality and regulation dynamics in connection with a stepped load-switchable automatic transmission.

This objective is attained in accordance with the invention by the objects of the independent claim. Further advantageous configurations are described in the dependent claims.

The invention advantageously consists in that the first control circuit is used for controlling and regulating the coupling during a first driving condition. The controlled variable corresponds to the actual value of the engine speed n_MOT_IST, which corresponds to the input rotational speed of the clutch. During the second driving condition is used a second control circuit, whose controlled variable is equivalent to the actual value of the differential rotation of a clutch dnK_IST, and finally during the third driving condition, the clutch is impinged by a controlled pressure value dependent upon various influence magnitudes. The three driving conditions here correspond to a startup process below a vehicular limiting speed in tractive operation as a first condition, operating beyond the startup process above a vehicular limiting speed with a positive or negative torque in push-pull operation as a second condition as well as operating below a vehicular limiting speed with a negative torque at the output in push operation during the third condition, wherein the startup process differs from the other driving conditions in that the vehicular limiting speed is smaller than a limiting value, and the vehicle engine can be stalled beneath this limiting speed.

Through the process of the invention, advantageously a better reaction of the transmission control is obtained on load switching, especially when removing the gas in the third condition, since here the pressure value of the clutch is only controlled and not regulated.

Furthermore, the clutch differential rotational speed is not reset to a zero value so that, in this way, advantageously a vibration isolation between the vehicle engine and the transmission is reached.

In an advantageous refinement of the invention, it is proposed that the load switching be decisively determined by a third control circuit, and that the first and third or the second and third control circuit be connected with each other through a decoupling network, wherein the decoupling network in any given case has a first and a second signal path. With a load switching in the sense of a cross-over circuit, an internal control circuit, namely the third control circuit, consequently determines the behavior of the clutches to be switched on or off. Since during load switching, due to the rotatory masses to be delayed or accelerated, it comes to an influencing of the clutch, it is suggested for this case that the first and third or the second and third control circuit be connected to each other via a decoupling network in such a manner that the two regulators, which are in use, are advantageously not mutually influenced in their action.

With a load switching from a first into a second gear ratio step of the automatic transmission during the first operating condition, the first control circuit operates by means of the decoupling network via the first signal path on the third control circuit and the third control circuit operates by means of the decoupling network via the second signal pathway back to the first control circuit.

With a load switching from a first into a second gear ratio step of an automatic transmission during the second operating condition, the second control circuit operates by means of the decoupling network via the first signal pathway on the third control circuit and the third control circuit operates by means of the decoupling network via the second signal path on the second control circuit.

In a refinement of the invention, it is proposed that the pressure level pAK of the clutch in the first and the second condition be computed on the basis of an offset value pAK_OFF and a summation value pSUM. The summation value pSUM is decisively determined from the balance of the control torque MK (ST) of the clutch, the regulated summation torque MK(RE)= of the clutch and the decoupled load switching torque MLS_ENT.

The controlled torque MK(ST) is decisively determined on the basis of the dynamic clutch torque MDYN_MOT and a regulated torque MK(RE).

The regulated summation torque MK(RE)' of the clutch is determined on the basis of the dynamic engine torque MDYN_MOT and a regulated torque MK(RE).

The regulated torque MK(RE) in the first operating condition is decisively determined on the basis of the theoretical/actual comparison of a magnitude equivalent to a engine speed n_MOT and a performance specification DKI of a driver by means of a regulator.

The gear-dependent theoretical rotational speed dn_SW (i) for a startup gear of the automatic transmission is determined in a second driving condition through a characteristics map KFI(i), i=1, 2. This characteristics map here represents an allocation of performance specifications of the driver (DKI) and output rotational speed nAB of the clutch.

During a load switching of the stepped automatic transmission, a shift from a first characteristics map KFI(i1) into a second characteristics map (KFI(i2) takes place.

The regulated torque in the second operating condition MK(RE) is definitively determined on the basis of the theoretical/actual comparison of the rotational speed differential dnK_SW, dnk_IST of the clutch and a performance specification DKI of a driver by means of a regulator.

Advantageously, the regulator contains a restricted integrator wherewith the integrator is fed as input magnitudes the system deviation on the basis of the theoretical/actual comparison of the rotational speed differential dnK_SW, dnk_IST of the clutch, the set speed of the performance specification DKI, and the ratio of the actual to the theoretical value of the differential rotational speed dnK_IST/dnK_SW of the clutch.

Advantageously, the theoretical value of the differential rotational speed dnK_SW of the clutch results from the addition of the theoretical value offset dnLS_SW and a gear-dependent differential rotational speed dn_SW(i) of the clutch.

Advantageously, during a transition from the first or third driving condition into the second driving condition, the theoretical value of the differential rotational speed dnk_SW is led through a filter, especially a dynamic delaying element, whereby the current actual value of the differential rotational speed is set as the initial value of the delaying element.

In a refinement of the invention, it is suggested that, in the second condition, the theoretical value offset of the differential rotational speed dnLS_SW of the clutch be increased during load switching from a first i1 into a second gear ratio step I2 of the automatic transmission in the load assumption and gradient adjusting phase, and be reduced again when ending the concluding phase.

A switch from a gear-dependent characteristic map KF(i1) to a characteristic map (KF(i2) also takes place here during load switching.

The characteristics maps are here constructed such that with a vehicular speed v smaller than a limiting value GW, an elevated differential rotational speed dn_SW(i) of the clutch results. In this way, an active stalling protection for non-startup gears, thus, for example, the fourth or fifth gear of the automatic transmission, is attained.

Advantageously, an elevated differential rotational speed dn_SW(i) of the clutch is calculated as stalling protection in the second operating condition as well. Here the elevated differential rotational speed dn_SW(i) is set greater than the difference on the basis of the most minimal rotational speed of the internal combustion engine n_MOT_MIN and the output rotational speed of the clutch nAB.

In the third operating condition, the pressure level pAK of the clutch results on the basis of a pressure value, which is dependent upon one or more of the following magnitudes: Butterfly valve setting, brake activation, braking pressure, engine torque, load switching or the like, and wherein the pressure value is a controlled magnitude.

Advantageously, a device for carrying out a process for controlling and regulating a clutch in a stepped load-switchable automatic transmission for a motor vehicle is also being indicated. For this, an electronic control device with a first and a second control circuit is provided, whereby the controlled variable of the first control circuit is equivalent to the engine speed, and the controlled variable of the second control circuit is equivalent to the actual value of a differential rotational speed of the clutch.

Furthermore, a third control circuit is provided, which is connected via a decoupling network to the first and the second control circuit, and whereby the third control circuit definitively determines load switching.

Furthermore, the decoupling network has one first and one second control signal path each between the first and third and between the second and third control circuit.

This invention will be explained below on the basis of the exemplary embodiment of a load switch represented in the drawings, wherein.

Figure 1:
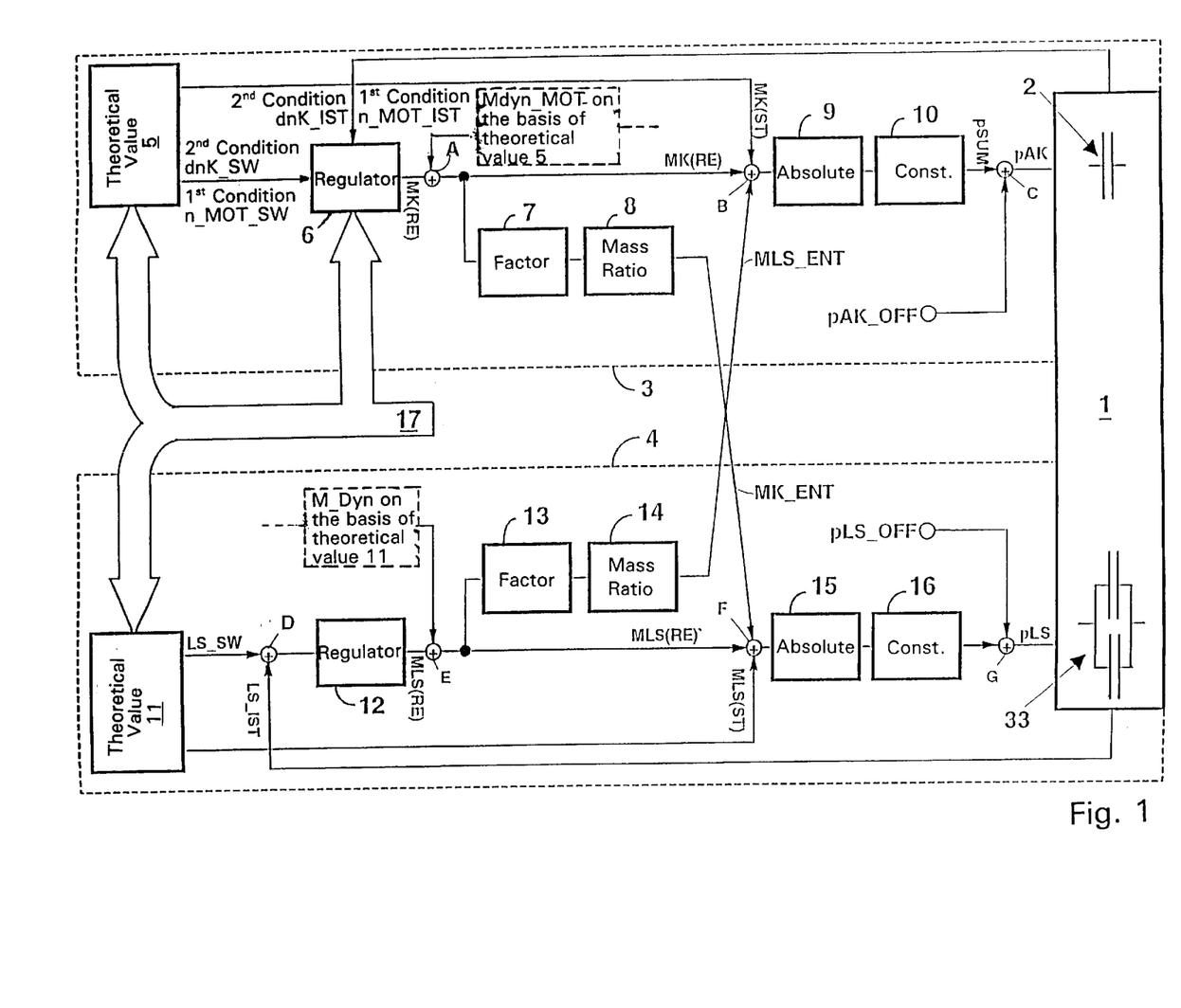
FIG. 1 provides an overview of the first and second control circuit.

FIG. 1 provides an overview of the two control circuits. The first control circuit for controlling and regulating the clutch 2 is designated with the reference numeral 3. The second control for controlling and regulating the load switching of an automatic transmission 1 is designated with reference numeral 4. A cross-over circuit is to be understood as a load switch within the meaning of the invention. As is well known, during cross-over shifting, a first clutch opens, while a second clutch closes. In FIG. 1, the two clutches are represented with reference numeral 33. Such a process is known from DE 44 24 456 A1. A startup clutch is to be understood as the clutch 2 in the sense of the invention. These can be connected in series before the automatic transmission 1 or correspond to the transformer bypass clutch or a clutch integrated into the transmission. The input magnitudes 17 are fed to the first as well as to the second control circuit. The input magnitudes 17 are: the signal of the power preset by the driver, for example, the throttle flap data DKI or its gradient, the torque of an internal combustion engine, which is not shown, which drives the automatic transmission 1 and the input/output rotational speed of the clutch 2. The first control circuit 3 consists of the blocks: theoretical value specification 5, regulator 6, factor 7, mass ratio 8, absolute value 9, and constants 10. The theoretical value specification 5 supplies the regulator theoretical value and the controlled torque MK(ST) of the clutch 2 as well as the dynamic engine torque MDYN_MOT as output magnitudes. The inner structure of the theoretical value specification 5 is explained in connection with FIG. 2. The input magnitudes 17, the regulator theoretical value, as well as the actual value are applied on the regulator 6.

In the first condition, the regulator theoretical value corresponds to the theoretical engine speed n_MOT_SW and the actual value of the actual engine speed n_MOT_IST. In the second condition, the regulator theoretical value corresponds to the theoretical differential rotational speed on clutch 2 dnK_SW and the actual value to the actual differential rotational speed on clutch 2 dnK_IST.

The interior structure of the regulator 6 will be explained in connection with FIG. 3. The regulated torque MK(RE) of clutch 2 is the output magnitude of regulator 6. From the regulated summation torque MK(RE), the clutch 2, and the dynamic engine torque MDYN_MOT results the controlled summation torque MK(RE)', the summation point A. The same is summated at point B with the controlled torque MK(ST) of clutch 2 and the decoupled torque of the load switching MLS_ENT. The absolute value is formed from this sum by means of function block 9 and the result is weighted with a constant, the function block 10. A summated pressure pSUM is the output magnitude. A pressure offset pAK_OFF is superimposed on this summated pressure pSUM at the summation point. The pressure level pAK resulting from this is the pressure level acting upon the clutch 2.

The second control circuit 4 consists of: the theoretical value specification 11, the regulator 12, factor 13, mass ratio 14, absolute value 15, and constants 16. The second control circuit 4 determines the sequence of load switching. A load switching, that is, a shift form a first into a second gear ratio step, consists of the following sections for a traction delayed switching: a rapid filling, filling equilibrium, load assumption, gradient setting, sliding, gradient degradation, and closing phase. Based on the input values, the function block theoretical value specification 11 determines the theoretical value LS_SW of the load switching, the controlled torque MLS(ST) of the load switching, and the dynamic torque M_DYN. The theoretical value LS_SW of the load switching is compared to the actual value LS_IST of the load switching at the summation point D. The actual value LS_IST is determined from output magnitudes of the automatic transmission 1. The resulting system deviation is the input magnitude of the regulator 12. The regulator output value corresponding to the regulated torque MLS(RE) of the load switching is added at summation point E to the dynamic torque M_DYN on the basis of theoretical value specification 11. The regulated summation torque MLS(RE)' of the load switching results from this. This is added at the summation point F to the controlled torque MLS(ST) of the load switching and to the decoupled clutch torque MK_ENT. The absolute value is formed on the basis of the result by means of function block 15. The result is then weighted with a constant in function block 16. This output magnitude is impinged with an offset pLS_OFF at summation point G. The result is the pressure value pLS for the engaging clutch 33 in connection with the cross-over circuit.

The first and second control circuit 3, 4 are connected with each other via a decoupling network. The decoupling network contains a first signal pathway in which the function block 7 and the function block 8 are arranged. The input magnitude of the first signal pathway is the regulated summation torque MK(RE)'. The same is multiplied by a factor, the function block 7. This factor is adjusted on the basis of experiments. The result from this is weighted in function block 8 with the mass ratio of the engine-mass to the sum of the engine-mass and the transmission mass. The output magnitude is then the decoupled torque MK_ENT of clutch 2. The second signal path of the decoupling network has function blocks 13 and 14, the input magnitude of which is the regulated summation torque MLS(RE)' of load switching. The decoupled torque of load switching MLS_ENT is the output magnitude of the second signal path.

Figure 2:
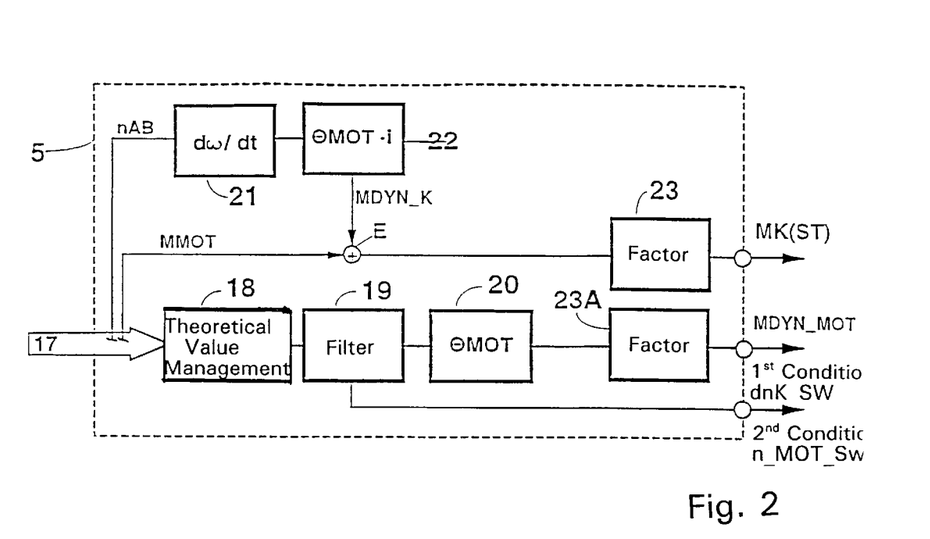
FIG. 2 shows the theoretical value specification function block.

The interior structure of theoretical value specification 5 is represented in FIG. 2. These are fed to the input magnitudes 17. A raw theoretical value of the differential rotational speed of the clutch 2 is determined on the basis of the input magnitudes rotational speed of the internal combustion engine, throttle flap data DKI and internal combustion engine torque. This value is then filtered in filter 19, usually conducted as a PT1 element with gradient restriction. The theoretical value dnk_SW of the differential rotational speed of clutch 2 is an output magnitude of filter 19. This theoretical value is made available at the output of the theoretical value specification 5. A further output magnitude of the filter 19 is linked in the function block 20 to the engine inertia factor theta_MOT and a factor, the reference number 23A. Then the dynamic torque of the internal combustion engine MDYN_MOT is the output magnitude. The angle velocity gradient dOmega/dt is determined on the basis of the input magnitude output rotational speed of clutch nAB by means of the function block 21. The result is multiplied in function block 22 by the engine inertia factor theta-MOT and the current gear ratio of automatic transmission 1. The dynamic torque MDYN_K on the clutch 2 is the output magnitude during a load switching. The following relationship applies here:

in the gradient adjustment phase:

MDYN_K=theta-MOT . i1 . dOmega/dt or in the sliding phase:

MDYN_K=theta-MOT . i2 . dOmega/dt

MDYN_K: dynamic clutch torque theta-MOT: internal combustion engine inertia factor i1: first gear ratio step i2: second gear ratio step dOmega/dt: clutch angle velocity gradient This dynamic torque of the clutch 2 is linked at summation point E to the torque MMOT issued by the internal combustion engine. The result is added at summation point F to the previously calculated dynamic torque of the internal combustion engine MDYN_MOT. The result is weighted in function block 23 with an adjustable factor, whose output magnitude is the controlled torque MK(ST) of the clutch 2.

Figure 3:
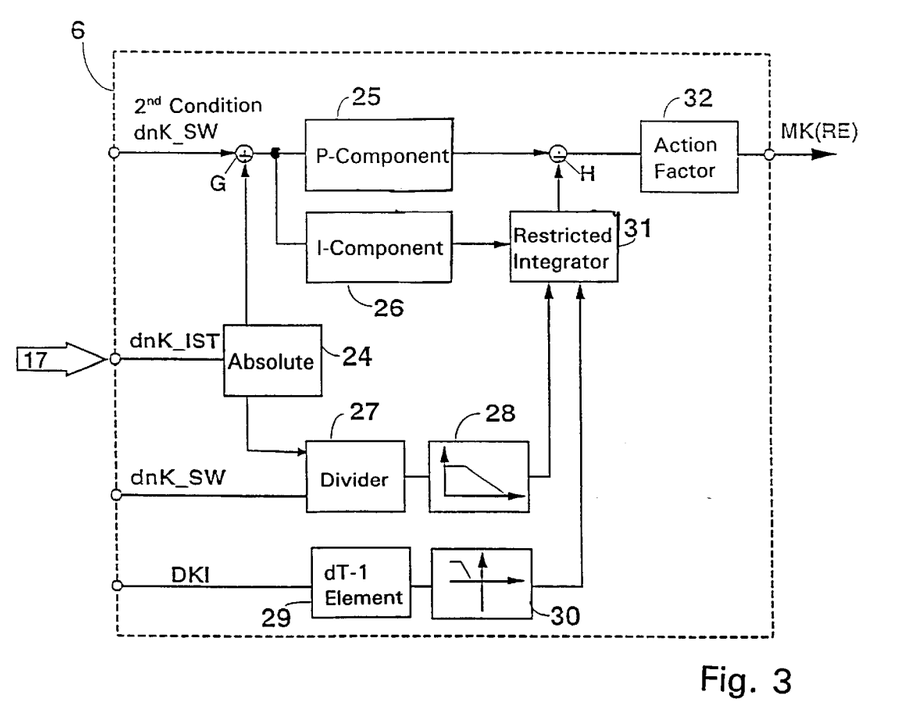
FIG. 3 depicts the regulator function block.

The interior structure of the regulator 6 is represented in FIG. 3. To the same are fed the input magnitudes 17 as well as the theoretical value dnK_SW and the actual value dnK_IST of the differential rotational speed of clutch 2. The absolute value is formed on the basis of the actual value dnK_IST in function block 24. This absolute value is then the input magnitude of the divider 27 or summation point G. To the divider 27 is fed as second input magnitude to the theoretical value dnK_SW of the differential rotational speed of clutch 2. The quotient is passed to function block 28, dynamic reduction characteristic curve. The input value of the integrator, the reference number 31, is artificially enlarged via this characteristic curve by very small drift values, for example less than 10 rotations. In this way, an additional ramp-like pressure reduction is obtained. The cutoff results from the ratio of the actual value to the theoretical value of the rotational speed differential of clutch 2. The throttle flap data input magnitude DKI is the input signal for a dT1-element, the reference number 29. The output signal of this filter is then the input signal for the A "open rapidly" characteristic curve, the reference number 30. The input value of the integrator 31 is increased via this characteristic curve depending upon the performance command of the driver or its gradient upon rapid gas cancellation. An additional ramp-like reduction results from this. The pressure reduction can be modified via the characteristic curve.

The theoretical value dnK_SW is summated at summation point G with the absolute value of the actual value of the clutch 2 of the differential rotational speed. The result is then passed parallel first over a function block P component, reference number 25, and second over an I component, reference number 26. The summation point H. The output magnitude of function block 26 acts on the restricted integrator, reference number 31. The output value of the restricted integrator 31 is linked at summation point H with the proportional component from function block 25, and passed to function block 32, the action factor. In which direction the current regulator torque is supposed to act is determined via the action factor. This is necessary for determining the decoupling torque MK_ENT.

Figure 4:
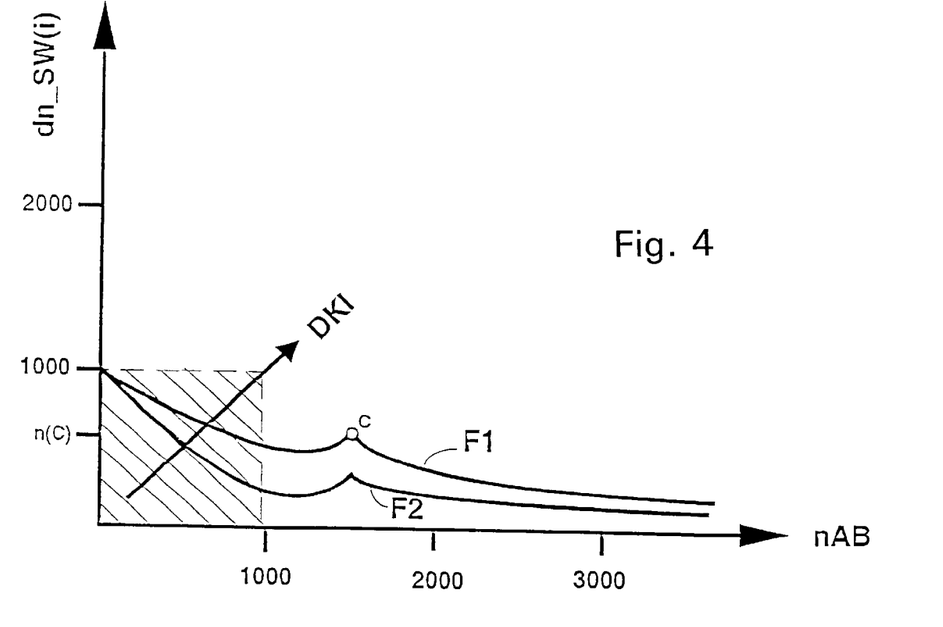
FIG. 4 illustrates a second characteristics map for non-start up gears.

A gear-dependent characteristics map KF2(i) is represented in FIG. 4. The differential rotation speed dn_SW(i) for non-startup gears, thus, for example, the fifth gear of the automatic transmission, is determined by this. The characteristics map contains a region defined by the two restriction characteristic curves F1 and F2. The restriction line F2 corresponds to 0% and the restriction line F1 to 100% of the throttle flap data DKI. A point C is drawn in at the restriction line F1. This rotational speed magnification, value n (c), causes that the clutch be held in the drifting condition so that an active vibration isolation can be attained. A region drawn in cross hatched is represented within the characteristics map. This region serves as a stalling protection, that is, at low output rotational speeds nAB of clutch 2, this is impinged by a defined theoretical value of the differential rotational speed.

The stalling protection can also be calculated according to the following relationship:

dnK_SW(i)>NMOT_MIN-nAB

NMOT_MIN: most minimal rotational speed of the internal combustion engine nAB: Output rotational speed of the clutch 2

A first characteristics map KF(1) with i=1 or 2 is used for a startup gear, thus, for example, the first (i=1). The second characteristics map (KF2(i), i=3 up to n, is used for non-starting gears, thus, for example, the fifth (i=5). Consequently an independent characteristics map exists for each gear. The transition from the first KF(1) to a second characteristics map KF(i) takes place during load switching of automatic transmission 2.

Figure 5:
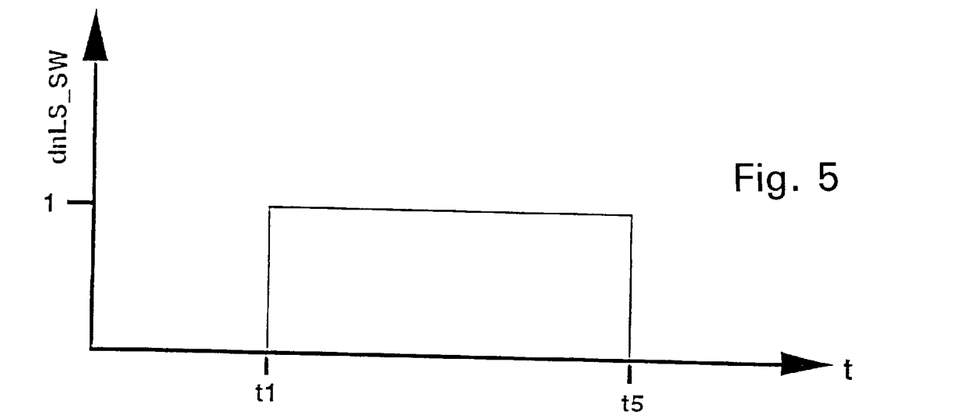
FIG. 5 shows the load switching differential rotational speed theoretical value over time.
Figure 6:
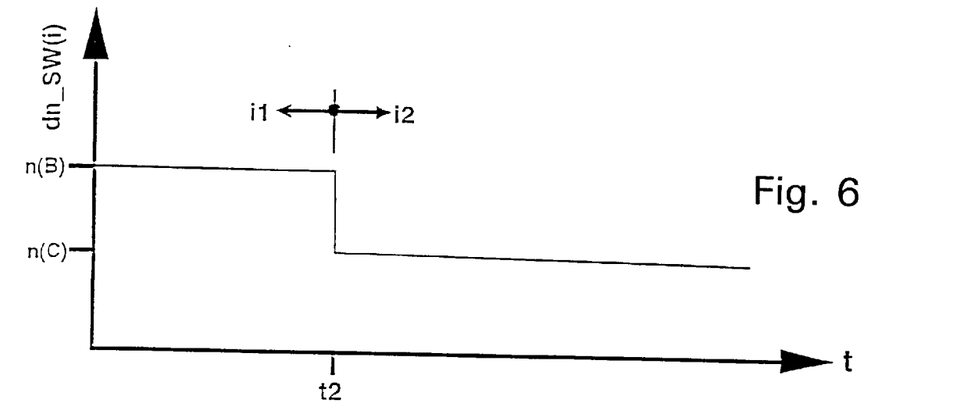
FIG. 6 discloses the differential rotational speed theoretical value gear-dependently over time.
Figure 7:
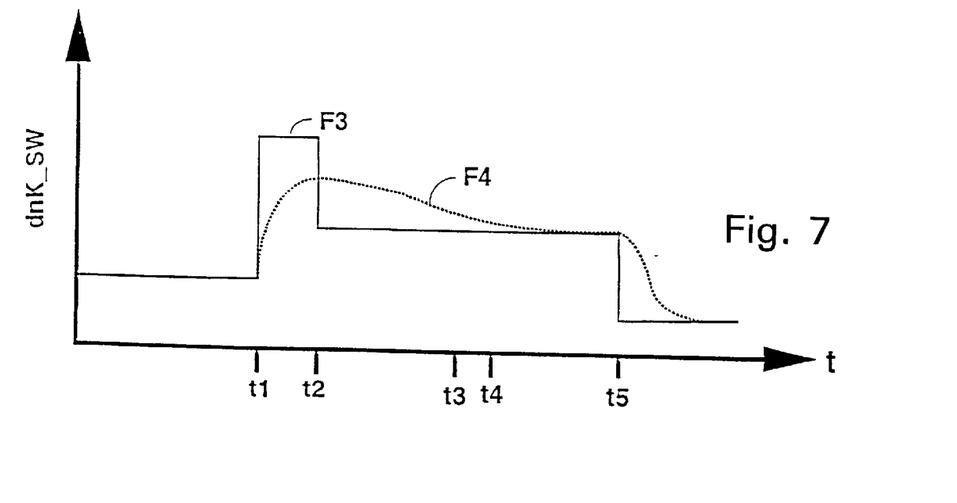
FIG. 7 represents the clutch differential rotational speed over time.

FIGS. 5 to 7 show in each case over time: the theoretical value offset dnLS_SW, the gear-dependent differential value dn_SW(i) and the theoretical value of the differential rotational speed dnK_SW of the clutch 2. The time courses are represented for the third condition, that is, during a load switching from a first into a second gear ratio step of the automatic transmission. It is assumed that it is a matter of a load switching from a startup gear into a non-startup gear.

In FIG. 6, two rotational speed values n(B) and n (c) are entered on the ordinate. These two rotational speed values are determined in accordance with the characteristics map KF(i1) or the characteristics map KF(i2) in accordance with FIG. 4. The conversion from rotational speed value n(B) to rotational speed value n (c) takes place in connection with the change of the transmission ratio, designated in FIG. 6 with i1 and i2. In FIG. 7, a time course F3 is executed as a solid line. This course corresponds to the output magnitude of function block 18, the theoretical value management, of FIG. 2. The theoretical value dnK_SW of the differential rotational speed of clutch 2 obtained by means of the filter 19 from the course F3 is represented with the reference numeral F4. The course F3 results from the addition of courses in accordance with FIGS. 5 and 6 at any point in time. At time t1, the theoretical value offset dnLS_SW is suddenly increased. The gear-dependent differential rotational speed dn_SW(i) at time t1 has the value in accordance with n(B). From this results at the point in time t1 the sudden increase of the theoretical value for the differential rotational speed dnK_SW of clutch 2. At point in time t2, a switch is made from characteristics map KF(i1) to a characteristics map KF(i2). From this results a new rotational speed value n (c). The point in time t2 is synonymous with the end of the gradient adjustment phase and the beginning of the sliding phase. The sliding phase ends at the time t3. During the period of time t3 to t4 takes place the gradient degradation phase. During the period of time t4 to t5 takes place the concluding phase of the engaging clutch 33. At time t5, the theoretical value offset is reduced to zero in accordance with FIG. 5. From this, likewise results in accordance with FIG. 7 a reduction of the theoretical value of the differential rotational speed dnK_SW of the clutch 2.

In the first and second condition, that is, in the startup process or when operating above a vehicular limiting speed, the theoretical value of the differential rotational speed dnK_SW of the clutch 2 corresponds to the gear-dependent differential rotational speed value dn_SW(i).

The sequence of the process of the invention is as follows: First condition: The startup takes place via a engine speed regulator. The vehicle is set into motion until, after falling below the differential rotational speed limit at the clutch 2 or after exceeding the basic speed, the transition into the second condition takes place. Second condition: The differential rotational speed is now regulated on the transmission. The theoretical value is gathered from the characteristics map corresponding to the gear. In order to obtain a smooth transition, the current actual differential rotational speed dnK_IST is applied to filter placed in series after the theoretical value generator as an initial value. Thus, a constant change of the actual differential rotational speed course is obtained, and therewith a continuous clutch torque course.

If a load switch is now initiated, a change is made from characteristics map KF(i1) to a characteristics map KF(i2) in accordance with FIG. 4. From this there results then a sequence in accordance with FIGS. 5 to 7. During the load switching, a decoupling torque MLS_ENT of the load switch is added by way of the decoupling network via the second signal pathway to the controlled MK(ST) and regulated summation torque MK(RE)'. Through the first signal pathway, a decoupling torque MK_ENT of the clutch 2 is added to the engaging clutch.

REFERENCE NUMERALS

1 Automatic transmission
2 Clutch
3 First control circuit
4 Second control circuit
5 Theoretical value specification
6 Regulator
7 Factor
8 Mass ratio calculation block
9 Absolute value
10 Constant
11 Theoretical value specification
12 Regulator
13 Factor
14 Mass ratio calculation block
15 Absolute value
16 Constant
17 Input magnitudes
18 Theoretical value management
19 Filter
20 Inertia factor
21 dOmega/dt calculation block
22 Calculation block
23, 23A Factor
24 Absolute value
25 P component
26 I component
27 Divider
28 Dynamic reduction characteristic curve
29 dT1-element
30 "Open rapidly" characteristic curve
31 Restricted integrator
32 Action factor
33 Clutch engaging during load switching
dn_SW(i) Gear-dependent differential rotational speed
dnK_SW Clutch differential rotational speed theoretical value
dnK_IST Clutch differential rotational speed actual value
MK(ST) Controlled clutch torque
MK(RE) Regulated clutch torque
MK_ENT Clutch decoupling torque
MK(RE)' Clutch regulated summation torque
pAK_OFF Startup clutch pressure offset
pSUM Summated pressure
pAK Clutch pressure level
MDYN_K Dynamic clutch torque
pLS_OFF Load switching pressure offset
nEIN Clutch input rotational speed
nAB Clutch output rotational speed
n_MOT_IST Actual engine speed value
n_MOT_SW Theoretical rotational speed
n_MOT_MIN Internal combustion engine most minimal rotational speed
LS_SW Load switching theoretical value
LS_IST Load switching actual value
MLS(ST) Controlled load switching torque
MLS(RE) Regulated load switching torque
MLS(RE)' Regulated load switching summation torque
MLS_ENT Load switching decoupling torque
MMOT Engine torque
MDYN_MOT Dynamic engine torque
DKI Throttle flap information=load setting
dnLS_SW Theoretical value offset
i1, i2 Gear ratio step
KF(i) Characteristics map
v Vehicular speed
GW Vehicular speed limiting value

What is claimed is:

1. A process for controlling and regulating a clutch in a stepped power shiftable automatic transmission for a motor vehicle in which an electronic control device determines the behavior of the clutch during operating conditions in which a load shift from a first gear ratio step to a second gear ratio step can be effected, the process comprising the steps of:
   in a first operating condition where the vehicle is under acceleration and below a first vehicular limiting speed, controlling the clutch by a control device, a first control circuit having a first control parameter input equivalent to an actual value of engine speed,
   in a second operating condition where the vehicle is over the first vehicular limiting speed, controlling the clutch by a control device, a second control circuit having a second control parameter input equivalent to an actual value of a differential rotational speed and where the actual value of the differential rotational speed is not reset to zero, and
   in a third operating condition where the vehicle is in overrun and below a second vehicle limiting speed, controlling the clutch by a control pressure dependent on various parameters,
   wherein the load switching is decisively determined by a third control circuit and the first and third or the second and third control circuits are connected with one another via a decoupling network, wherein the decoupling network has in each case a first and a second signal value.

2. The process according to claim 1, wherein with a load switching from the first (i1) into the second gear ratio step (i2) of the automatic transmission, during the first operating condition, the first control circuit acts upon the third control circuit by means of the decoupling network via a first signal path, and the third control circuit acts upon the first control circuit by means of the decoupling network via the second signal pathway.

3. The process according to claim 1, wherein in connection with a load switch from the first (i1) into the second gear ratio step (i2) of the automatic transmission, during the second operating condition, the second control circuit acts upon the third control circuit by means of the decoupling network, and the third control circuit acts upon the second control circuit by means of the decoupling network via a second signal pathway.

4. A process for controlling and regulating a clutch in a stepped power shiftable automatic transmission for a motor vehicle, in which an electronic control device determines the behavior of the clutch during operating conditions in which a load shift from a first gear ratio step to a second gear ratio step can be effected, the process comprising the steps of:
   in a first operating condition where the vehicle is under acceleration and below a first vehicular limiting speed, controlling the clutch by a control device, a first control circuit having a first control parameter input equivalent to an actual value of engine speed,
   in a second operating condition where the vehicle is over the first vehicular limiting speed, controlling the clutch by a control device, a second control circuit having a second control parameter input equivalent to an actual value of a differential rotational speed and where the actual value of the differential rotational speed is not reset to zero, and in a third operating condition where the vehicle is in overrun and below a second vehicle limiting speed, controlling the clutch by a control pressure dependent on various parameters;

a control pressure level (pAK) of the clutch in the first and second condition results from an offset value (pAK_OFF) and a summation value (pSUM)(pAK=pAK_OFF+pSUM), wherein the summation value (pSUM) is decisively determined on the basis of the balance of a controlled torque (MK(ST)) of the clutch, a regulated summation torque (MK(RE)') of the clutch, and a decoupling load switching torque (MLS_ENT) (pSUM=f(MK(ST), MK(RE)', MLS_ENT)).

5. The process according to claim 4, wherein the controlled torque (MK(ST)) is decisively determined on the basis of a clutch dynamic torque (MDYN_K) and an engine torque (MMOT)(MK(ST)=f(MDYN_K, MMOT).

6. The process according to claim 4, wherein the regulated summation torque (MK(RE)') of the clutch is determined on the basis of a dynamic engine torque (MDYN_MOT) and a regulated torque (MK(RE)) of the clutch.

7. The process according to claim 6, wherein the regulated summation torque (MK(RE)) in the first driving condition is decisively determined on a basis of a theoretical/actual comparison of a magnitude equivalent to the engine speed and a performance specification (DKI) of a driver by means of a regulator.

8. A process for controlling and regulating a clutch in a stepped power shiftable automatic transmission for a motor vehicle, in which an electronic control device determines the behavior of the clutch during operating conditions in which a load shift from a first gear ratio step to a second gear ratio step can be effected, the process comprising the steps of:

in a first operating condition where the vehicle is under acceleration and below a first vehicular limiting speed, controlling the clutch by a control device, a first control circuit having a first control parameter input equivalent to an actual value of engine speed, in a second operating condition where the vehicle is over the first vehicular 4 limiting speed, controlling the clutch by a control device, a second control circuit having a second control parameter input equivalent to an actual value of a differential rotational speed and where the actual value of the differential rotational speed is not reset to zero, and in a third operating condition where the vehicle is in overrun and below a second vehicle limiting speed, controlling the clutch by a control pressure dependent on various parameters;

a gear-dependent theoretical rotational speed (N_MOT_SW(i)) for a startup gear of the automatic transmission is determined by characteristics maps (KF(i)), wherein the characteristics maps represent an allocation of performance specifications by a driver (DKI) and an output rotational speed (nAB) of the clutch.

9. The process according to claim 8, wherein a switch from a first characteristics map (KF1(i1)) to a second characteristics map (KF1(i2)) during a load switch takes place at the end of a gradient adjustment phase.

10. The process according to claim 6, wherein the regulated torque (MK(RE)) is definitively determined on a basis of a theoretical/actual comparison of the rotational speed differential (dnK_SW, dnK_IST) of the clutch and a performance specification (DKI) of a driver by means of a regulator.

11. The process according to claim 10, wherein the regulator contains a restricted integrator, wherein the integrator is fed, as input magnitudes, a system deviation from the theoretical/actual comparison of the rotational speed differential (dnK_SW, dnK_IST) of the clutch, an adjustment speed of the performance specification (DKI), and a ratio of the actual to the theoretical value of the differential rotational speed (dnK_IST/dnK_SW) of the clutch.

12. The process according to claim 10, wherein the theoretical value of the differential rotational speed (dnK_SW) of the clutch results from an addition of a theoretical value offset (dnLS_SW) and a gear-dependent differential rotational speed (dn_SW(i)) of the clutch.

13. The process according to claim 12, wherein during a transition from the first or third operating condition, in the second operating condition, the theoretical value of the differential rotational speed (dnK_SW) is guided over a dynamic delaying element, wherein the current actual value of the differential rotational speed (dnK_IST) is set as an initial value of the theoretical value of the differential rotational speed.

14. The process according to claim 12, wherein in the second operating condition, the theoretical value offset of the differential rotational speed (dnLS_SW) of the clutch during load switching from a first (i1) into a second gear ratio step (i2) of the automatic transmission is increased in a load assumption or gradient adjusting phase and is reduced again with a termination of a concluding phase.

15. The process according to claim 12, wherein a gear-dependent theoretical rotational speed (N_MOT_SW(i)) for a startup gear of the automatic transmission is determined by characteristics maps (KF(i)) wherein the characteristics maps represent an allocation of performance specifications (DKI) by a driver and an output rotational speed (nAB) of the clutch and wherein the transfer from a first characteristics map (KF(i1)) to a second characteristics map (KR(i2)) during the load switch takes place at the end of a gradient adjustment phase.

16. A process for controlling and regulating a clutch in a stepped power shiftable automatic transmission for a motor vehicle, in which an electronic control device determines the behavior of the clutch during operating conditions in which a load shift from a first gear ratio step to a second gear ratio step can be effected, the process comprising the steps of:

in a first operating condition where the vehicle is under acceleration and below a first vehicular limiting speed, controlling the clutch by a control device, a first control circuit having a first control parameter input equivalent to an actual value of engine speed, in a second operating condition where the vehicle is over the first vehicular limiting speed, controlling the clutch by a control device, a second control circuit having a second control parameter input equivalent to an actual value of a differential rotational speed and where the actual value of the differential rotational speed is not reset to zero, and in a third operating condition where the vehicle is in overrun and below a second vehicle limiting speed, controlling the clutch by a control pressure dependent on various parameters;

at a vehicular speed (v) of less than a limiting value (GW), an increased differential rotational speed (dn_SW(i)) of the clutch is set as stalling protection over a respective characteristics map (KF(i)).

17. The process according to claim 16, wherein the differential rotational speed (dn_SW(i)) is set to be greater than the difference on the basis of the most minimal rotational speed of an internal combustion engine (n_MOT_MIN) and an output rotational speed of the clutch (nAB).

18. A control device for controlling and regulating a clutch in a stepped power shiftable automatic transmission for a motor vehicle in which the control device determines the behavior of the clutch in operating conditions in which a load shift from a first gear ratio step to a second gear ratio step can be effected, comprising:

- a first control circuit having a first control parameter input equivalent to an actual value of engine speed for controlling the clutch in a first operating condition wherein the vehicle is under acceleration and below a first vehicular limiting speed, controlling the clutch by a control device,

- a second control circuit having a second control parameter input equivalent to an actual value of a differential rotational speed for controlling the clutch in a second operating condition wherein the vehicle is over the first vehicular limiting speed, wherein the actual value of the differential rotational speed is not reset to zero, and

- a third control circuit for definitively detecting a load shift connected via a decoupling network to the first and second control circuit,

- a decoupling network providing a first signal path between the first and third control circuits and a second signal path between the second and third control circuits, and the clutch is controlled by a control pressure dependent on various parameters in a third operating condition wherein the vehicle is in overrun and below a second vehicle limiting speed.

* * * * *